Feb. 1, 1927.
C. W. AVERY
1,616,405
MACHINE AND METHOD FOR DRAWING GLASS
Filed May 5, 1920
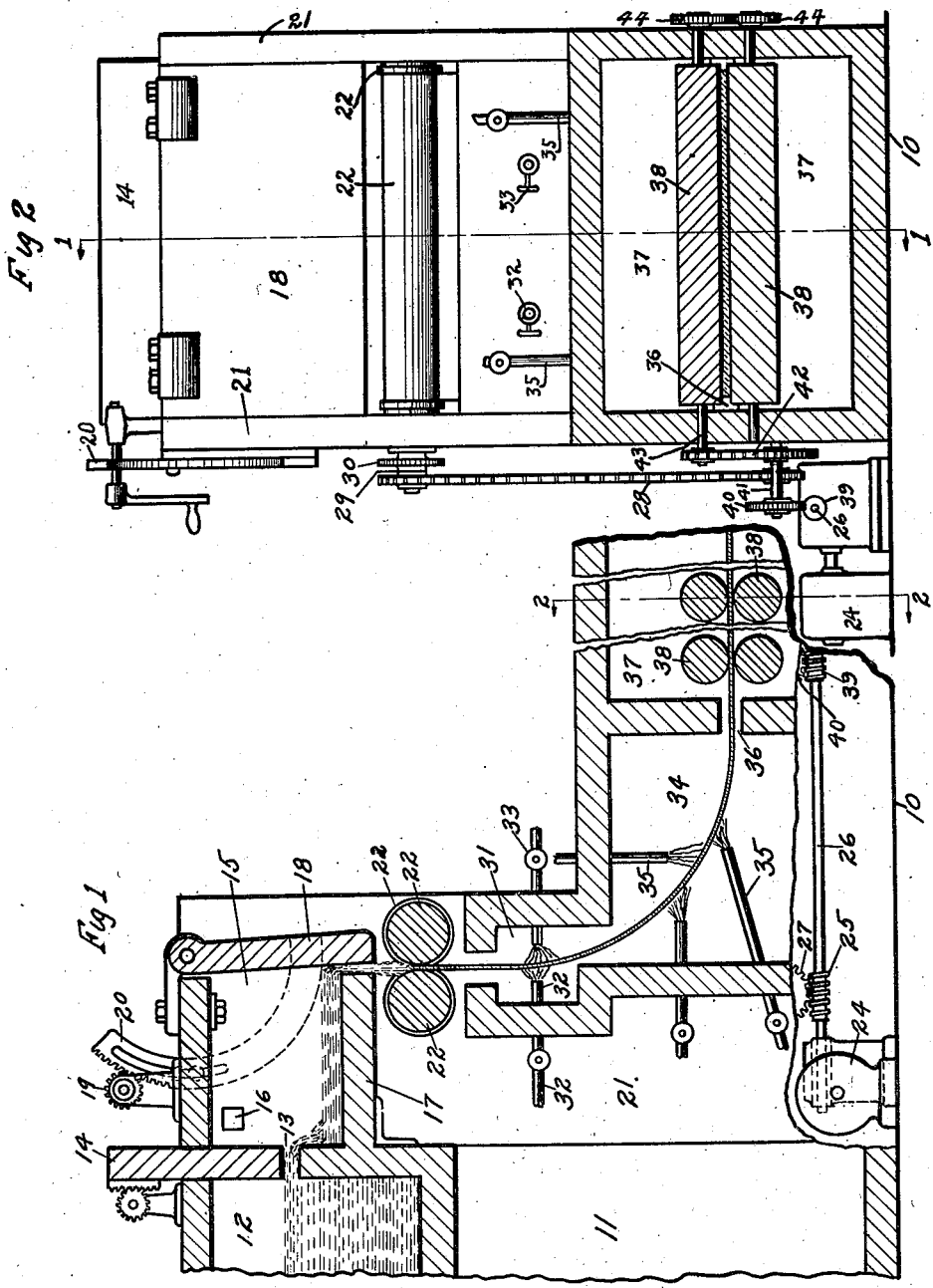
INVENTOR.
Clarence W. Avery.
BY J. H. Harness
ATTORNEY.

Patented Feb. 1, 1927.

1,616,405

UNITED STATES PATENT OFFICE.

CLARENCE W. AVERY, OF DETROIT, MICHIGAN, ASSIGNOR TO FORD MOTOR COMPANY OF DELAWARE, OF DETROIT, MICHIGAN, A CORPORATION OF DELAWARE.

MACHINE AND METHOD FOR DRAWING GLASS.

Application filed May 5, 1920. Serial No. 378,967.

The object of my invention is to provide an improved machine and method for forming glass of simple, durable and inexpensive construction.

A further object of my invention is to provide a machine for making glass which may be so used that the glass may be formed into a continuous strip whereby the operation of the machine and its production may be a continuous process.

A further object of my invention is to provide means for removing the molten glass from a glass melting tank which are adapted to transform the molten glass into a finished strip of sheet glass.

A further object of my invention is to provide means, in connection with a melting tank for glass, for sizing the glass taken from the tank, for reducing the glass to a predetermined temperature, then drawing it to a predetermined size and thickness and, in combination with these means, means for glazing or finishing the surface of the strip of glass.

With these and other objects in view, my invention consists in the arrangement, combination, and construction of the various parts of my improved device, as described in the specification, claimed in my claims, and shown in the accompanying drawings in which:

Figure 1 is a vertical sectional view taken on the line 1—1 of Figure 2, illustrating the construction of my improved machine, and Figure 2 is a vertical transverse sectional view taken on the line 2—2 of Figure 1.

Referring to the accompanying drawings, I have used the reference numeral 10 to indicate generally the floor or base line upon which my improved machine rests. At one end are vertical supporting walls 11 designed to support a melting tank structure 12, which is of ordinary construction, and adapted to maintain a continuous supply of molten glass. At the discharge end of the tank is a discharge opening 13 designed to draw off the molten glass from the tank, this discharge opening 13 being so arranged that the width thereof may be varied by raising and lowering a gate 14. This gate 14 may be arranged, if so desired, to form a scum apron above the opening 13. Supported by the tank 12, or in any suitable way, such as vertical walls 21, is a final refining chamber 15, which is adapted to receive the molten glass flowing from the discharge opening 13. This refining chamber may be provided with a plurality of gas supplying openings or burners 16 whereby the temperature of the glass therein may be maintained to a predetermined degree, and, if desired, the temperature of the glass may be permitted to lower gradually from the receiving to the discharge end of the final refining chamber. This chamber is constructed with a floor 17 across which the glass received from the opening 13 flows, and in the form of device here shown a swinging gate 18 is adapted to limit the width of the flow of glass over the end of the floor 17. The position of the gate may be varied by rotating the pinion 19 to thereby swing the segmental rack 20, which is fixed to the gate 18.

Journalled in the side supporting walls 21 below the final refining chamber are a pair of sizing rolls 22. The rolls are driven by means of a motor 24 which is connected to a worm gear 25 on the shaft 26 which in turn is connected through a worm wheel 27 and chain 28 to a drive shaft 29 formed by extending one of the trunnions of the rollers 22. The second roller 22 is connected to the first by a pair of gears 30 whereby these rollers may rotate in opposite directions continuously.

I have hereinbefore referred to the sizing rollers, and it will be understood that when I use the term "sizing rollers" that I refer to the rollers 22 together with their connections. They are arranged below the discharge end of the floor 17 so that the glass flowing from the end of that floor will drop into the trough formed between the adjacent upper surfaces of the rollers and spread along the rollers. It will be seen that when this trough formed by the rollers has molten glass therein, that rotation of the rollers which causes the adjacent sides to move downwardly will permit a stream of glass to pass out downwardly between the rollers which is equal in thickness to the distance between the peripheries of the rollers 22. If, then, the rollers 22 be rotated continuously when the discharge opening of the tank is open and the discharge opening of the final refining chamber is open, then a continuous stream of glass of a predetermined thickness will be fed out between the rollers 22 downwardly.

The length of the rollers 22 will limit the width of the strip of glass, and the width of the strip may further be determined by regulating the amount of glass supplied to the rollers, which can be done by moving the gate 18. Where this method of regulating the width is used, the glass is supplied to the rollers in a quantity just great enough so that it will flow far enough toward the ends of the rollers before passing therebetween, to allow the formation of a strip of the desired width.

Below the rollers 22 is disposed a temperature regulating chamber comprising in the form here shown a rectangular chamber 31 having elongated slots at the top and bottom thereof adapted to permit the strip of glass to pass there-through. The slot in the bottom of this chamber 31 may be of sufficient width to allow the glass to be swung laterally somewhat, if so desired.

Extended into the temperature regulating chamber 31 are a plurality of supply pipes 32 having controlling valves 33 therefor, whereby the supply of gas or liquid passing through said pipes may be regulated. By this construction it will be seen that the temperature of the strip of glass passing through the temperature regulating chamber may be reduced or increased to any desired degree and this reduction or increase maintained for any desired period of time.

Below the temperature regulating chamber is a glazing chamber 34 which, in the form of device here illustrated, is designed to subject the strip of glass passing therethrough to the heat or flame of a plurality of burners 35 whereby the surface of the glass may be fire-glazed to give it a desired finish. The fire-glazing chamber 34 has an opening 36 in its forward wall through which the strip of glass is designed to be passed.

Next to the fire-glazing chamber is a chamber 37 designed to receive devices for placing the glass passing through the preceding chambers under tension to thereby draw the strip of glass to a desired width and thickness. These tension devices in the form of device here illustrated comprise pairs of opposed parallel rollers 38 designed to receive the glass between them whereby the glass may be placed under tension by the action of these rollers. I have here shown these rollers as being driven from a second worm 39 mounted on the shaft 26 which in turn is connected through a worm wheel 40, shaft 41, and chain 42 with a trunnion 43 of one of the rollers 38. The opposite ends of these rollers may be connected by pinions 44 to drive the rollers of each pair in opposite directions to thereby force the glass between them. Any number of pairs of these rollers may be driven if desired.

In the practical operation of my improved device, glass in the tank 12 is reduced to a molten state, then allowed to flow out through the opening 13 into the final refining chamber, where the glass is reduced to or maintained at a desired temperature by the burners 16 so that it may flow out over the end of the bottom 17 at a predetermined temperature. The amount of flow from the tank to the final refining chamber, and from the latter, may be adjusted by the gates 14 and 18. Sufficient glass is allowed to accumulate in the trough between rollers 22 so that rotation of these rollers will allow a strip of glass of predetermined width and thickness to pass out downwardly. This strip of glass travels on downwardly into the temperature controlling chamber where the temperature of the glass is brought to a predetermined degree, whence the glass passes downwardly and laterally through the glazing chamber and between the rolls 38. The rolls 38 are arranged to revolve at such speed and carry off the glass rapidly enough so that the glass between the rolls 38 and the rolls 22 may be stretched to a predetermined width and thickness. The glass thus formed and received by the rolls 38 is then conducted on into a leer or the tempering chamber, then cut into pieces, and thence taken to a place for storage or where it may be used.

An advantage of my improved method and machine resides in the fact that a strip of glass may be caused to come continuously from the leer, which need only be cut and trimmed before being ready for use. A further advantage resides in the fact that this glass coming from the leer is substantially free from variations in refractions or other imperfections such as are common in the glass formed with the methods with which I am familiar. The advantage of producing a continuous strip of glass is obvious without further enlargement.

Some changes may be made in the arrangement and construction of the various parts of my improved device without departing from the spirit of the invention therein and it is my intention to cover by my claims such changes as may be reasonably included within the scope thereof.

I claim as my invention:

1. In the art of producing a continuous glass sheet adapted to form the source of supply for the commercial product, the method of producing the sheet which consists in producing an embryo sheet formation from a constant source of supply of the molten glass, subjecting the embryo formation to a conditioning treatment while the formation is subject to complete and maximum gravity action exerted in the direction of sheet advance to give the sheet the desired dimensional characteristics, subjecting the conditioned sheet to a polishing action, and then leading the sheet laterally into the leer, the path of the sheet travel while subject to such gravity activity presenting the direction of sheet advance as including an initial vertical direction and a final horizontal direction, the intermediate portion of the flight having characteristics of an approximate arc of relatively large radius, the length of the radius being maintained approximately constant by the speed of advance of the sheet into the leer, the polishing activity being provided while the sheet is travelling within the curved portion of such flight.

2. In the art of producing a continuous glass sheet adapted to form the source of supply for the commercial product, the method of producing the sheet which consists in producing an embryo sheet formation from a constant source of supply of the molten glass, subjecting the embryo formation to a conditioning treatment while the formation is subject to complete and maximum gravity action exerted in the direction of sheet advance to give the sheet the desired dimensional characteristics, subjecting the conditioned sheet to a polishing action while under the action of gravity, and then leading the sheet laterally into the leer, the path of the sheet travel while subject to such gravity activity presenting the direction of sheet advance as including an initial vertical direction and a final horizontal direction, the intermediate portion of the flight having characteristics of an approximate arc of relatively large radius, the length of the radius being maintained approximately constant by the speed of advance of the sheet into the leer, the polishing activity being provided while the sheet is travelling within the curved portion of such flight.

3. In the art of producing a continuous glass sheet adapted to form the source of supply for the commercial product, the method of producing the sheet which consists in establishing a continuous flow of the molten glass, producing an embryo sheet formation in such flow-path, subjecting the embryo formation to gravity action exerted in the direction of sheet advance to complete the dimensional characteristics of the sheet and polishing its faces during the period of such action, and then advancing the polished sheet into the leer with the direction of advance movement approximately horizontal the path of the sheet travel while subject to such gravity activity presenting the direction of sheet advance as including an initial vertical direction and a final horizontal direction, the intermediate portion of the flight having characteristics of an approximate arc of relatively large radius, the length of the radius being maintained approximately constant by the speed of advance of the sheet into the leer, the polishing activity being provided while the sheet is travelling within the curved portion of such flight.

4. In the art of producing a continuous glass sheet adapted to form the source of supply for the commercial product, the method of producing the sheet which consists in establishing a continuous flow of the molten glass, producing an embryo sheet formation in such flow-path, leading the embryo formation through conditioning and polishing chambers in succession while maintaining the formation under complete and maximum gravity activity exerted in the direction of sheet advance to produce a polished formation having the dimensional characteristics of the sheet, and then leading the polished formation in a substantially horizontal direction to the leer, the path of the sheet travel while subject to such gravity activity presenting the direction of sheet advance as including an initial vertical direction and a final horizontal direction, the intermediate portion of the flight having characteristics of an approximate arc of relatively large radius, the length of the radius being maintained approximately constant by the speed of advance of the sheet into the leer, the polishing activity being provided while the sheet is travelling within the curved portion of such flight.

5. In the art of producing a continuous glass sheet adapted to form the source of supply for the commercial product, the method of producing the sheet which consists in establishing a continuous flow of the molten glass, producing an embryo sheet formation in such flow-path, establishing a travel path for the embryo sheet with the path leading in a curved direction and maintaining the sheet free from support during its travel through such curved path to place the traveling sheet under complete and maximum gravity activity, subjecting such sheet to conditioning and polishing action within the zone of travel included in such curved path, and then leading the polished sheet in a substantially horizontal direction to the leer.

6. In the art of producing a continuous glass sheet adapted to form the source of supply for the commercial product, wherein the molten glass is given its sheet form intermediate the melting chamber and the leer, and wherein the molten glass is delivered under gravity activity, a sheet forming and polishing instrumentality including means for producing an embryo formation, said means being located in the flow-path of the glass, means spaced from and out of vertical alinement with the forming means and operative to support and advance the sheet to travel in a substantially horizontal plane, conditioning means operative to render the moving sheet responsive to complete and maximum gravity activity exerted in the direction of sheet advance to complete the dimensional characteristics of the sheet during movement between the forming and advancing means, and fire-polishing means operative on the travelling sheet while the latter is under gravity action, said conditioning and polishing means being positioned between the forming and advancing means and operative successively on the sheet formation, the lateral displacement of the sheet advancing means being such as to produce a curved travel path of the sheet within the gravitation zone with the degree of curvature having characteristics of an approximate arc of relatively large radius, the length of such radius being maintained approximately constant by the speed of travel of such advancing means, said polishing means being active on the sheet during sheet travel within the curved zone.

CLARENCE W. AVERY.